Jan. 8, 1963   C. W. MacMILLAN   3,071,863
WHEEL ALINEMENT GAUGE
Filed Jan. 10, 1961   3 Sheets-Sheet 2
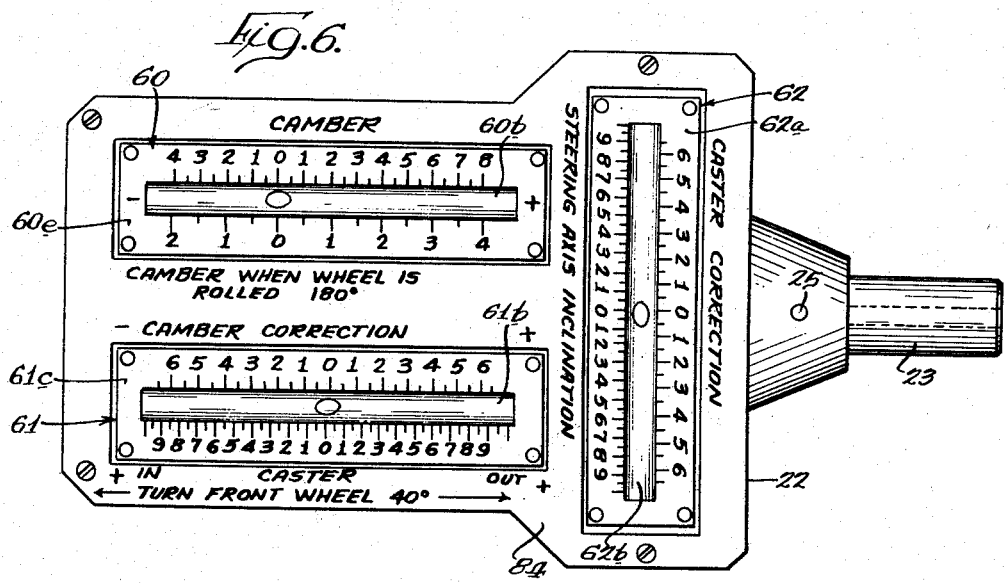
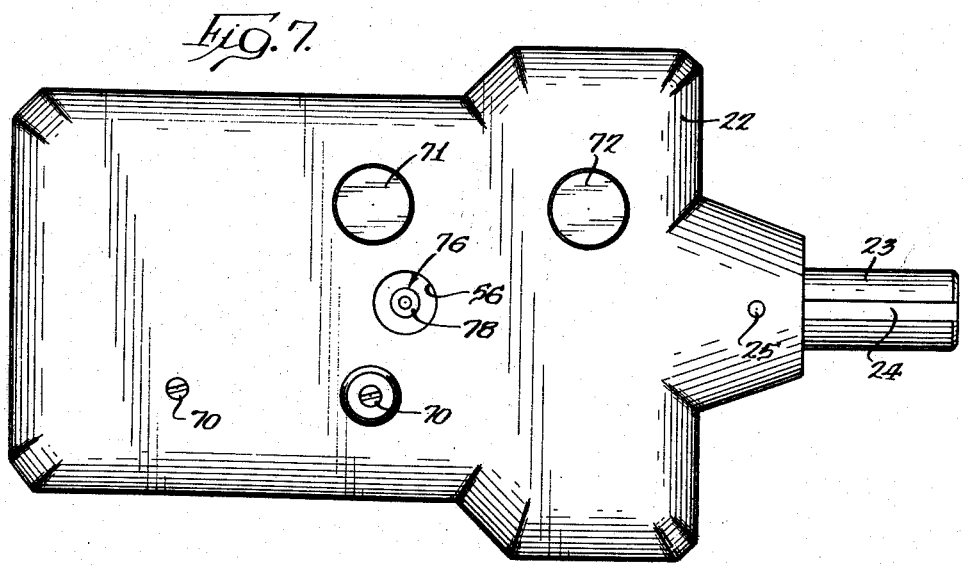
INVENTOR.
Charles W. MacMillan
BY
Guy, Desmond & Parker
Attys Jan. 8, 1963                    C. W. MacMILLAN                    3,071,863
                                WHEEL ALINEMENT GAUGE
Filed Jan. 10, 1961                                              3 Sheets-Sheet 3
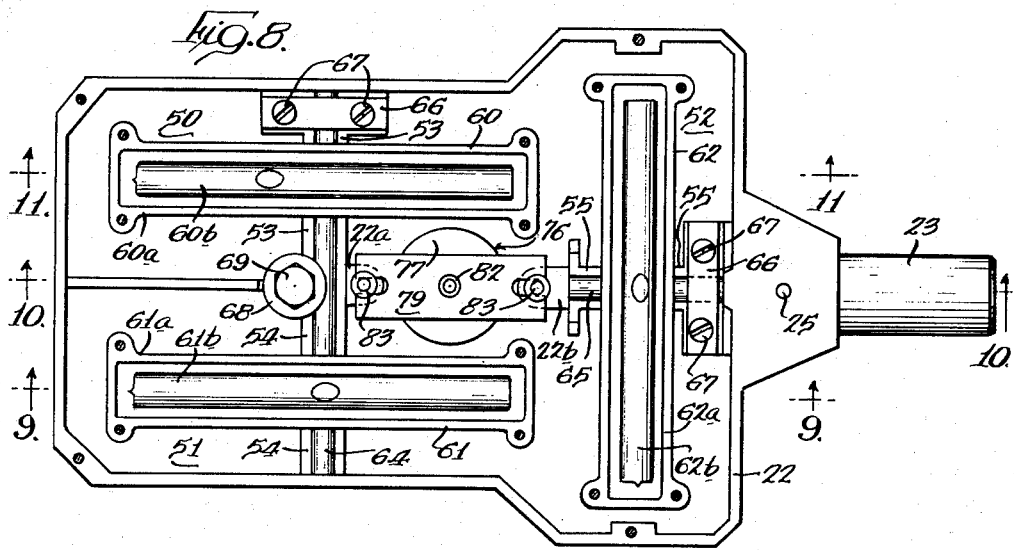
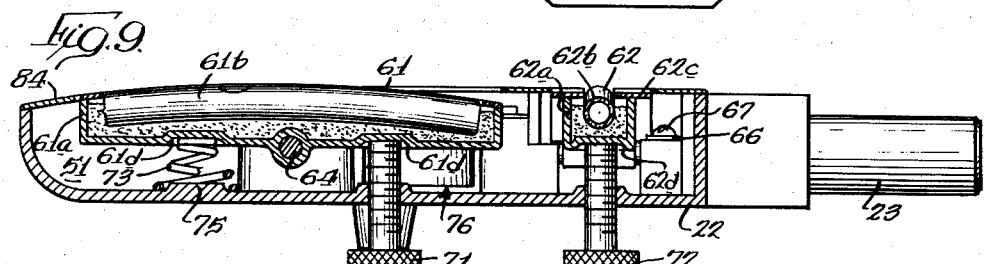
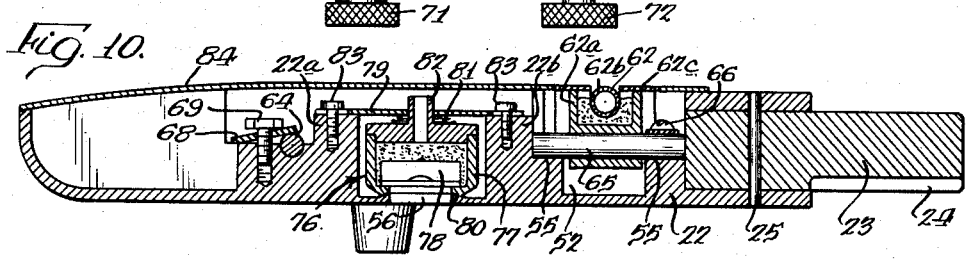
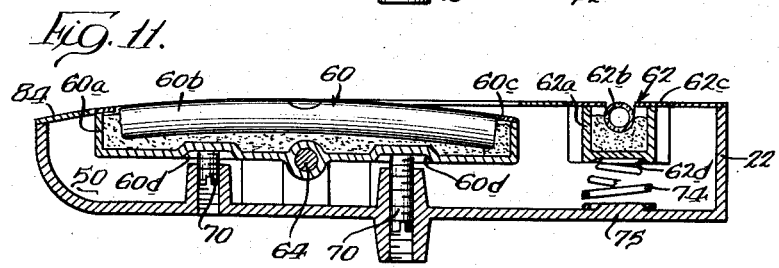
INVENTOR.
Charles W. MacMillan
BY
Jay, Desmond & Parker
Attys

United States Patent Office 3,071,863
Patented Jan. 8, 1963

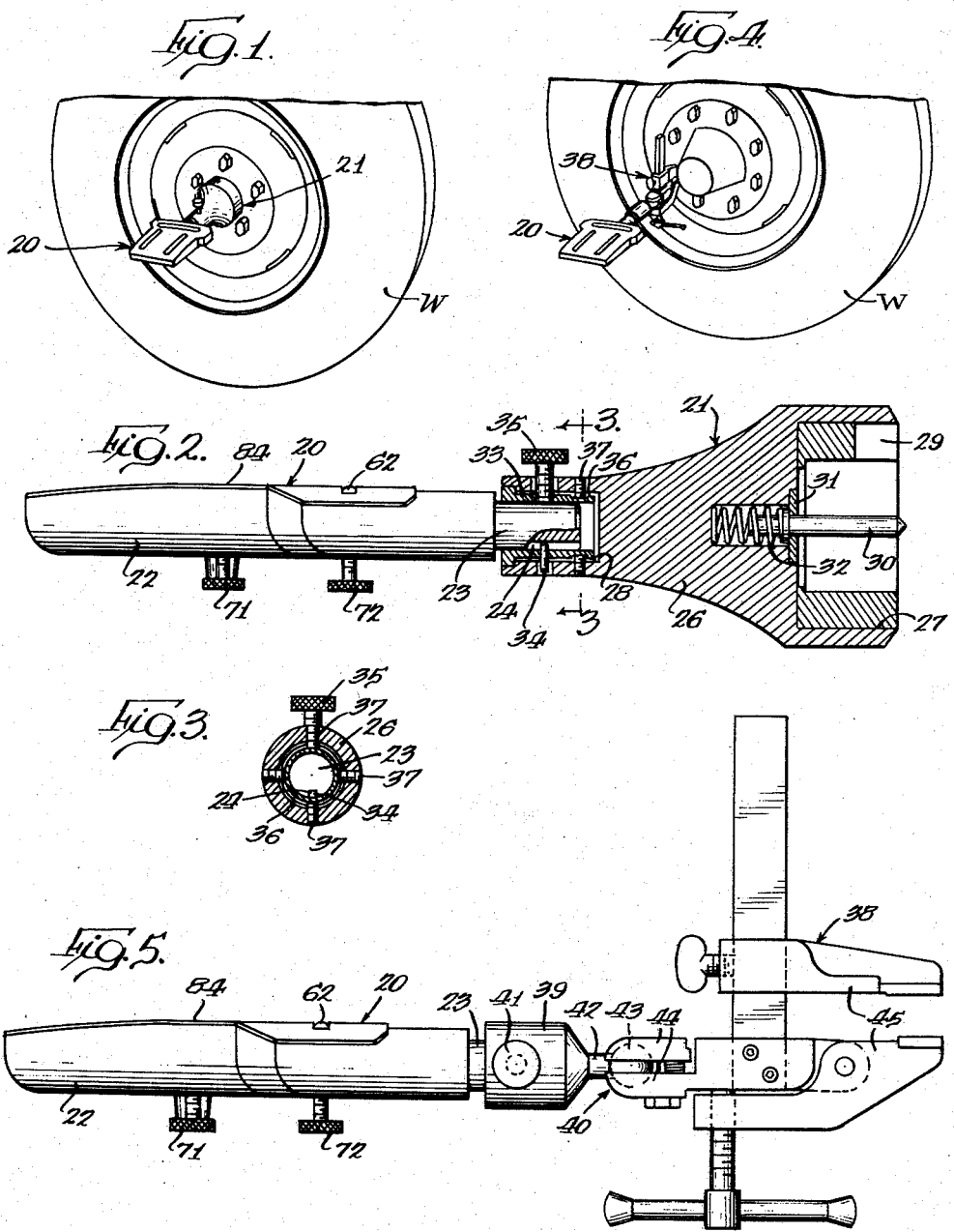

3,071,863
WHEEL ALINEMENT GAUGE
Charles W. MacMillan, Rock Island, Ill., assignor to Bear Manufacturing Company, Rock Island, Ill., a corporation of Delaware
Filed Jan. 10, 1961, Ser. No. 81,762
12 Claims. (Cl. 33—203.18)

The present invention relates to gauges adapted to be attached to the steering wheels of vehicles to indicate the caster, camber and steering axis inclination of the respective wheel. The invention is concerned particularly with improvements in such gauges facilitating convenient attachment of the same to vehicle wheels and use of the same both for checking wheel alinement and indicating alinement corrections as they are being made, and also facilitating economical mass production of the gauges.

Wheel alinement gauges of the type herein referred to are comprised essentially of a case or body adapted for endwise attachment to a vehicle wheel, a transversely disposed spirit level for indicating steering axis inclination, a first longitudinally disposed spirit level for indicating the caster angle and a second longitudinally disposed spirit level for indicating wheel camber. While the functions of the two longitudinal levels could be attained with a single longitudinal level, or the functions of all three levels could be achieved with a single swivel-mounted level, the three-level type of gauge is preferred and is described herein in detail. To accommodate attachment to a vehicle wheel, it has been customary heretofore to provide on the gauge body or case either a permanent magnet adapted to engage the wheel hub, or a mechanical clamp adapted to be secured to the wheel spindle or to a wheel nut. In some cases, the adapter is fixed to the body and in others it is adjustable relative to the body.

For checking the caster angle and steering axis inclination, the wheel manipulative steps are the same irrespective of the gauge attaching means or adapter employed, and they involve, essentially, swinging the wheel to a 20 degree turn position in one direction, adjusting the steering axis and caster levels to zero, swinging the wheel through a 40 degree turn (i.e., to a 20 degree turn position in the opposite direction) and reading the scales associated with the levels. However, camber is checked in different manners depending upon the type of adapter or attaching means employed. If the gauge body is fixedly secured to an attaching means intended for direct axial alinement with the wheel spindle, camber is read directly from the camber scale without wheel manipulation. If, on the other hand, the gauge body is adjustably connected to the attaching means, camber is checked by inverting the gauge, leveling the same in a horizontal plane while inverted, rotating the wheel through an arc of 180 degrees to dispose the gauge face-up and reading the camber scale (at twice the scale of the aforesaid direct reading).

It is one object of the present invention to provide an improved gauge constructed for selective attachment to a wheel by either or both of a relatively fixed adapter and a relatively adjustable adapter, and providing conveniently read, accurate camber indications irrespective of the adapter means employed and thus irrespective of direct indication of wheel camber or indication of camber as a consequence of 180 degree rotation of the wheel.

It is a further object of the invention to provide improved apparatus for determining the alinement characteristics of a vehicle wheel comprising a gauge including means for indicating caster, camber and steering axis inclination, and gauge attaching means including magnetic means and clamp means selectively engageable respectively with the hub and the spindle of the wheel for determination respectively of the caster and camber and the steering axis inclination of the wheel, and also for indication respectively of the degree of camber correction and the degree of caster correction as corrections are effected. As a consequence of the defined apparatus, the magnetic means is employed to obtain the advantage of the facility and the speed with which the same may mount the gauge on a wheel hub to secure a quick-check of camber and caster, and to sustain the gauge in accurate position for indication of camber correction. Concurrently, the clamp means is available for attachment of the gauge to the wheel spindle whereby steering axis inclination may be accurately checked and caster correction may be accurately indicated without introduction of errors due to looseness of the wheel brake anchors and from other sources.

More particularly, it is an object of the invention to provide improved wheel alining apparatus comprising a gauge, a fixed magnetic adapter, an adjustable clamp adapter and means facilitating interchangeable association of either or both of the adapters with the gauge, whereby to attain the above stated objects and also to adapt the gauge for mounting on any wheel to determine the alinement characteristics in the best suited manner.

Another object of the invention is to provide an improved gauge as above described including means accommodating ready association and disassociation of adapters, and insuring coaxial association of the gauge with an adapter of the fixed type, for example, insuring disposition of the axis of the gauge perpendicular to the face of the attaching magnet when employing a fixed magnetic adapter.

An additional object of the invention is the provision of an improved gauge including a spherical leveling vial exposed to the bottom surface of the gauge body to facilitate leveling thereof in a horizontal position when camber is ascertained by 180 degree rotation of the wheel; and normally tamper-proof, but readily accessible, adjustable mounting means for the vial to facilitate factory adjustment of the same relative to the gauge body.

It is also an object of the invention to provide an improved gauge including tamper-proof, yet readily accessible, adjusting means for the camber level to facilitate factory authorized adjustment of the level relative to the gauge body, and thus relative to the spherical leveling vial and the fixed adapter, to insure accurate camber indications irrespective of the manner of checking camber.

Yet another object of the invention is to provide an improved gauge including adjustably mounted caster and steering axis levels and manually accessible adjusting means therefor, whereby the two levels may individually be set at will by the operator without necessity for manipulation of the gauge body or the adapter.

A further object of the invention is to incorporate all of the above described gauge improvements into a highly economical gauge construction particularly facilitating mass production of accurate gauges without necessity for minute tolerances in manufacture or assembly.

A still further object of the invention is the provision of an improved wheel alining gauge wherein the camber, caster and steering axis levels and the leveling vial are secured in holders simply to an approximate level, the holders are adjustably mounted in the gauge body to facilitate adjustment thereof without reliance upon accurate placement of the levels in the holders and/or accurate mounting of the holders in the body, the body is economically constituted and provided with an adapter receiving shaft or stem, and each adapter of the fixed type includes means for independently alining the adapter with the stem of any gauge body, all of which features facilitate economical mass production of an exceptionally accurate gauge.

Other objects and advantages of the invention will become apparent in the following detailed description.

Now, in order to acquaint those skilled in the art with the manner of making and using my improved gauge, I shall describe, in connection with the accompanying drawings, a preferred embodiment of the gauge and preferred manners of making and using the same.

In the drawings:

FIGURE 1 is a perspective view of the gauge of the invention associated with a vehicle wheel by a magnetic adapter of the fixed type;

FIGURE 2 is a side view of a gauge equipped with a fixed magnetic adapter, the adapter being shown in section;

FIGURE 3 is a cross-sectional view of the fixed adapter taken substantially on line 3—3 of FIGURE 2;

FIGURE 4 is a perspective view of the gauge of the invention associated with a vehicle wheel by a relatively adjustable adapter of the clamp type;

FIGURE 5 is a side elevation of the gauge and adapter of FIGURE 4;

FIGURE 6 is a top plan view of the complete gauge;

FIGURE 7 is a bottom plan view of the gauge;

FIGURE 8 is a top plan view of the gauge with the cover plate removed from the gauge body and the scale plates removed from the level holders; and FIGURES 9, 10 and 11 are longitudinal sectional views of the gauge taken respectively on lines 9—9, 10—10, and 11—11 of FIGURE 8; the views respectively showing, in particular, the caster level mount, the leveling vial mount and the camber level mount, and collectively showing the steering axis level mount.

Referring now to FIGURES 1 to 3, I have shown my improved gauge, indicated generally at 20, associated with the front wheel W of a vehicle by means of a relatively fixed magnetic adapter, indicated at 21. The gauge, which will be described in detail hereinafter, is comprised of a body 22 including at one end thereof an axially disposed longitudinally extending stem or shaft 23, the stem preferably being cylindrical and having a longitudinal keyway 24 in its lower surface. The stem may be formed integrally with the body, or as shown in FIGURE 10, may be a separate shaft secured in a complemental socket in the body by a cross pin 25 or the like.

The adapter 21 comprises either a one-piece or multiple-part body 26 having a large diameter cylindrical socket 27 at one end and a relatively small diameter cylindrical socket 28 at its other end. The socket 27 receives therein an annular permanent magnet 29, which is preferably notched or serrated at its outer or front face to provide a plurality of circumferentially spaced pole pieces. Each pole piece has a flat front face, and all of the faces are disposed in a common plane generally perpendicular to the axis of the body 26. It is one feature of the invention that the magnet need be disposed only generally or approximately in the defined relationship to the adapter body, thereby to facilitate mass production of the adapters. Generally, the pole faces of the magnet will be engaged with the flat, accurately machined outer face of the hub of the wheel W. To aline the magnet with the wheel and its spindle, the adapter 21 preferably includes an automatically retractable centering pin 30 adapted to be seated in the axial recess conventionally provided in the outer end face of the wheel spindle. The pin 30 is slidably mounted in an axial bore in the adapter body, slidably guided by a closure plate 31 secured to the adapter body, and resiliently urged in the outward direction by a spring 32 confined between the bottom of the bore and a motion limiting collar or flange on the pin. As a consequence of the defined structure, the adapter is readily applied to the vehicle wheel with the face of the magnet perpendicular to the axis of wheel rotation.

The socket 28 at the opposite end of the adapter body is of a diameter significantly greater than the diameter of the stem 23, and in particular, is of a diameter to receive therein with radial clearance a cylindrical collar or sleeve 33 having an inner diameter approximately equal to the outer diameter of the stem 23. The collar or sleeve has an accurately machined bore for intimate, axially alined reception therein of the stem, the collar preferably including a radial key 34 for guidable entry into the keyway 24 and a radial thumbscrew 35 engageable with the stem for locking the stem in the collar, whereby the stem may be secured to the collar against all relative movement. As indicated, the body 26 has radial bores entering into the socket 28 to accommodate passage of the key and the thumbscrew. The collar at its outer or rearward end is provided with a radial flange seating in a generally complementary counterbore in the body 26, and adjacent its forward end is provided with an annular groove or recess 36 within which are seated a plurality of adjusting screws 37. Specifically, a plurality of adjusting screws, at least three and preferably four in number, are threaded radially through the body 26 at equal circumferential spacings to one another, and each engages the collar 33 within the groove 36 thereby to retain the collar in the socket 28. More importantly, the screws are adjustable to dispose the collar 33 in the socket 28 in such position that the axis of the collar, and thus of the gauge stem 23, is perfectly perpendicular to the face of the magnet 29.

In manufacture, it is essential that magnetic adapters and gauge bodies be interchangeable and that when a gauge body stem is inserted in the socket 28 of a magnetic adapter that a true and fixed relationship is maintained with the magnet face. In order to accomplish this and not depend upon accurate machining of the parts to exacting tolerances, I have provided the adjustable collar or sleeve 33. To adjust the sleeve for interchangeable accuracy, the magnet 29 is attached to a master plate known to be vertical. A preadjusted master gauge is inserted in the sleeve, which is then adjusted by means of the top and bottom screws 37 until the master gauge reads zero or some other predetermined value on its scale. In this position, the axis of the master gauge and of the magnet are exactly horizontal. The other two set screws 37 located at 90 degrees from the pair of screws just adjusted are then locked tightly against the sleeve in groove 36 to aid in holding the collar in its adjusted position within the socket 28. The keyway 24 in the stem 23 and the key 34 in the sleeve 33 simplify adjustment of the sleeve, since the sleeve is thus required to be adjusted in only one vertical plane, and is adjusted as aforesaid for interchangeable use with any gauge adjusted in the manner hereinafter described.

In addition to the foregoing, the stem 23 of the gauge body facilitates selective use of the gauge with magnetic adapters as described, or any other form of fixed adapter, or relatively adjustable adapters, such as that shown in FIGURES 4 and 5. Specifically, an adapter 38 may be relatively adjustably associated with the gauge body by means of a socket 39 complementary to the stem 23 and a ball-and-socket swivel connector 40 universally connecting the socket to the adapter. In this unit, the socket 39 includes a radial thumbscrew 41 for securing the socket to the stem 23, a reduced extension 42 terminating in a ball 43, adjustable socket jaws 44 engaging the ball, and an adjustable clamp structure 45 of generally conventional form carried by the jaws, the clamp structure being adapted for attachment to the wheel hub or spindle, or to a wheel nut as shown in FIGURE 4, as is conventional in the art.

The gauge itself is preferably constructed in the manner illustrated in FIGURES 6 to 10. As shown, the body 22 of the gauge is preferably a rigid, thin-walled member such as a casting, that is generally hollow and upwardly open. At its forward end, the body includes a forwardly extending boss or projection having an axially disposed cylindrical bore or recess therein within which the stem 23 is seated in the manner previously described. Within its interior, the body includes a plurality of raised bosses and reinforcing struts which more or less define three elongated recesses, namely, a pair of spaced parallel longitudinally extending recesses 50 and 51, preferably extending forwardly from the rearward end of the body and disposed equal distances to opposite sides of the longitudinal axis of the body, and a transverse recess 52 adjacent the front of the body extending at right angles to the stem 23. The bosses define upwardly exposed arcuate bearing surfaces to opposite sides of each recess, namely, surfaces 53 to opposite sides of the recess 50, surfaces 54 to opposite sides of the recess 51, and surfaces 55 to opposite sides of the recess 52, each pair of bearing surfaces having a common axis substantially bisecting the respective recess. Preferably, the surfaces 53 and 54 are all aligned on a common axis commensurate with the coextensiveness of the recesses 50 and 51. Also, the bosses, particularly by virtue of the portions 22a, and 22b thereof, define a recess substantially centrally of the body which recess opens through the bottom of the body through a circular aperture or opening 56.

Each of the recesses 50, 51 and 52 is adapted for reception of a spirit level assembly, namely, the assembly 60, 61, 62, respectively. The assemblies 60, 61 and 62 are identical, and are each comprised of an elongate boxlike level holder 60a, 61a, 62a respectively, and a spirit level 60b, 61b, 62b respectively, secured in the holder. Preferably, each level is secured in its holder by cement or plaster of Paris, and it is a particular feature of the invention that the levels may be so set only to an approximate alinement in the holder and without necessity of having the spirit level bubble in an exact position. To complete each assembly, a scale plate 60c, 61c, 62c respectively, is secured to the upper surface of the holder, the plate having an elongate slot therethrough to reveal the spirit level and having scale indicia on both sides of the slot for purposes to be described. Each holder is also provided in its lower surface and substantially centrally thereof with a transversely apertured boss defining a transverse shaft-receiving opening or hole substantially bisecting the respective holder. A first shaft 64 extends through the shaft-receiving holes in both of the levels 60 and 61 and is rested on the alined bearing surfaces 53 and 54 with the levels in the respective recesses 50 and 51. Similarly, the shaft 65 extends through the shaft-receiving opening in the level 62 and is rested on the bearing surfaces 55 with the level in the recess 52. Thus, the levels are conveniently mounted in the body for pivotal movement about substantially their centers. To secure the shafts in the body, I provide a simple shaft embracing strap 66 adjacent one end only of each shaft, the strap being detachably secured to the body bosses by suitable fasteners 67. Due to the length of the shaft 64, I prefer to employ a second holding means therefor, suitably in the form of a washer 68 pressed against the shaft by a bolt 69 threaded into the central one of the bosses immediately to the rear of the shaft. Thus, the shafts and the level assemblies are quickly and conveniently assembled in the body, and yet firmly retained therein.

Each of the level assemblies, 60, 61 and 62 is pivotally mounted on the respective shaft to accommodate individual adjustment of each level after assembly thereof of the gauge body. As will presently appear, the level 60 comprises the camber gauge means, and as such, it is desirable that the same have a fixed position in the gauge body so far as users of the gauge are concerned. To this end, the level 60 is rendered adjustable by a pair of screws 70 threaded through tubular bosses in the lower wall of the gauge body and engaging against the lower surface of the level holder to opposite sides of the pivot axis of the same. Preferably, the pivot axis is disposed centrally of the level and the screws 70 are spaced equal distances to opposite sides of the pivot shaft, whereby the level assembly is reversibly positionable in the body, thereby further to facilitate assembly of the gauge. It is also preferred that each level holder have indentations 60d, 61d, 62d respectively, in its lower surface for guidable reception of the adjusting means. To render the screws 70 normally tamper-proof, the head ends thereof are imbedded in the interiors of the tubular bosses, and the outer extremities of the bosses may be filled with putty or the like to render the screws normally inaccessible.

The other two level assemblies 61 and 62 are intended for manual adjustment or manipulation by the user of the gauge, and to this end each is provided with a manually accessible adjusting element in the form, suitably, of a thumbscrew, 71, 72 respectively, threaded through the lower wall of the gauge body and engaging the lower surface of the respective level holder in a respective indentation 61d—62d. To the opposite side of the pivot axis of each of the levels 61 and 62, a compression spring, 73 and 74, respectively, is confined between the lower wall of the gauge body and the lower surface of the respective level holder, the springs thus biasing one end of each holder upwardly to force the other end downwardly into engagement with the respective thumbscrew. The springs are retained in operative position by virtue of engagement of the upper ends thereof in the respective indentations 61d—62d and engagement of the lower ends thereof over slight protuberances 75 from the base wall of the gauge body.

Within the recess defined by the bosses 22a and 22b, I adjustably mount a vial assembly 76 for use in leveling the gauge body. The assembly is comprised of a holder 77 of inverted cup-shape, a spherical leveling vial 78 cemented in the holder and exposed at the open end thereof, and a lock plate 79 engaged with the holder 77 and the bosses 22a and 22b. The holder 77 seats at its open lower end on the lower wall of the gauge body and to facilitate accurate adjustment of the spherical vial, the holder and the body are provided with complementary spherical seats, indicated conjointly at 80, which are annular in form and circumscribe the opening 56 in the gauge body and the opening in the lower end of the holder. Preferably, the holder is held to the seat by a conical spring 81 confined between the holder and the lock plate 79. By virtue of the seats 80, the holder 77 is mounted on the gauge body for swiveling movement to accommodate leveling of the vial 78 relative to the body. Consequently, the vial need be cemented in the holder only to an approximate level. To facilitate leveling, the holder preferably includes an upwardly projecting tubular extension 82, the purpose and use of which will subsequently be described. The locking plate 79, which serves to retain the holder and the vial in adjusted position, comprises an elongate plate having a central aperture conformably receiving the extension 82 and longitudinal slotted end portions overlying the body bosses 22a and 22b. Said bosses are bored and tapped for reception of screws 83 or like fasteners, the shanks of which are significantly smaller than and pass freely through the slots in the end portions of the lock plate. Consequently, with the screws loosened, the lock plate may be shifted from end-to-end and side-to-side, and may be canted, to such extent as may be necessary to level the vial 78 relative to the gauge body. After leveling, the screws may be tightened to lock the plate and thus the vial to the gauge body.

After the three spirit levels, complete with scale plates, the leveling vial and the stem 23 have been assembled with the body, and prior to assembly of the body cover plate 84, the camber level 60 and the leveling vial assembly 76 are factory adjusted relative to the gauge body to facilitate accurate use thereof with any relatively adjustable adapter, such as the adapter 38, and also to facilitate accurate use thereof with any relatively fixed adapter, such as the adapter 21, that has been factory adjusted in the manner described hereinbefore. Since the levels 61 and 62 are intended for manual manipulation in use, the same do not require factory adjustment, other than normal assembly. With the gauge components thus assembled, the stem 23 is inserted in a master socket known to be horizontal and the gauge is turned bottom side up to expose the vial 78 through the opening 56. The spherical vial is then adjusted by relaxing the screws 83, inserting a temporary small rod in the tubular extension 82 and moving the holder 77 by means of this rod until the bubble of the vial 78 is centered. When the bubble is centered, screws 83 are locked in place and the temporary rod is removed. After setting the spherical vial, the master socket is rotated bodily 180 degrees to dispose the gauge body face up. The bubble of the camber spirit level 60 is then set to zero on its scale by means of the screws 70, and permanently locked in place by means of said screws. Since the camber level 60 and the leveling vial 78 are adjusted in a horizontally disposed master socket, and the collar 33 in the adapter 21 is adjusted by use of a vertical plate and a master level, all gauges so adjusted and all adapters so adjusted are accurately interchangeable.

After adjustment of the level 60 and the vial 78, the gauge is completed by assembly of the cover plate 84. The plate comprises a simple sheet metal member conformed to the body and having elongate slots therein conformed to the holders and scale plates of the levels 60, 61, and 62. Suitably, both the body 22 and the cover plate 84 are conformed to the arrangement of the three levels, as shown particularly in FIGURE 6. Screws or other fasteners are preferably employed detachably to mount the cover plate on the body, and also to mount the scale plates on the level holders, thereby to facilitate authorized repair and maintenance of the gauge. It is to be particularly noted that due to the adjustable mounting of the spirit levels and the leveling vial, the cementing of the same to approximate levels in their holders and the detachable mounting of all components of the gauge, any component of the gauge may be quickly repaired or replaced and the gauge may be quickly recalibrated without necessity for replacement of the entire gauge.

As previously noted, the scale plate of each spirit level bears two sets of scale indicia, one to each side of the spirit level thereof. The level 60 is utilized for measuring wheel camber and its plate bears scales for indicating the degree of camber, one scale, the upper one in FIGURE 6, for indicating camber when ascertained directly, i.e., by employment of the combination depicted in FIGURE 1, and the other of which is twice as large, for indicating camber where camber is ascertained by first leveling the gauge body in a horizontal plane in inverted position by means of the vial 78 and then rotating the wheel 180 degrees. Suitably, the cover plate 84 bears indicia adjacent the level 60 for indicating that it is the camber level, and that the lower scale thereof is employed when camber is checked by the method involving 180 degree rotation of the wheel.

The level 61 is essentially the caster indicating level and it has a lower scale for indicating the degree of caster when a check is conducted in the customary manner, as previously described. Since the level is independently adjustable by manipulation of the thumbscrew 71, it may readily be adjusted as necessary when checking caster without necessity for manipulation of the gauge body or the adapter. Also this facility for independent adjustment renders the level 61 optimumly suited for direct indication of the degree of camber correction as wheel camber is being corrected. That is, if the camber check indicates that camber is off by, say, one degree, the scale 61 can be set to zero or to one degree, and as correction is effected the level 61 will indicate both the degree and the direction of correction. To this end, the scale plate 61c carries a second, upper scale for indicating camber correction, the scale being essentially the same as the upper scale of the level 60. As shown in FIGURE 5, the cover plate 84 may bear suitable indicia adjacent the level 61 for indicating its stated capabilities and uses.

The level 62 comprises essentially the means for indicating steering axis inclination, or as it has been known heretofore, "kingpin" inclination. To this end, it has one scale calibrated for indicating steering axis inclination when said inclination is checked in the customary manner, the same as for caster, by swinging the wheel through a 40 degree turn. Since the caster level 61 and the steering axis level 62 are adjustable by their thumbscrews 71 and 72, respectively, independently of one another and independently of the gauge body and the adapter, both levels may readily be set to accommodate simultaneous check of both caster and steering axis inclination. Also, the independent adjustability of the level 62 facilitates use of the same for direct indication of caster correction as the caster angle is being corrected, much the same as the caster level may be employed to indicate camber correction. Consequently, I provide the level 62 with the scale calibrated to indicate caster correction, and I provide indicia on the cover plate 84 to indicate the respective uses of the two scales.

As supplied to a user, the complete gauge apparatus includes all of the components disclosed herein, i.e., the gauge 20, the relatively fixed magnetic adapter 21, the relatively adjustable clamp-type adapter 38, and the quick-connect and disconnect means comprised of the stem 23 on the gauge, the sleeve 33 and screw 35 on the magnetic adapter, and the socket 39 and thumbscrew 40 on the clamp-type adapter. By virtue of this complete combination, the user is afforded the means necessary for checking the alinement of the wheels of substantially all vehicles, irrespective of the structural idiosyncrasies that prevent use of magnet adapters on some wheel assemblies and clamp adapters on others, or that require extreme projection of the gauge from the wheel. In the latter environment, the adapters are cooperable with one another to mount the gauge an extreme distance from the wheel. Also, the mutual cooperation of the adapters will permit magnetic attachment to the wheel hub while adjustably connecting the gauge relative to the wheel, whereby camber may be determined on the magnified scale (the lower camber scale as shown in FIGURE 6) in instances wherein there is no convenient place to secure the clamp adapter, or no room to roll the wheel through 180 degrees. In the latter case, the magnetic adapter may itself be rotated on the hub to secure the necessary relative rotation.

But more importantly for the majority of vehicles, the operator is afforded means whereby he can quickly and accurately check caster and camber by use of the magnetic adapter. If the quick-check reveals errors in alinement, the clamp adapter, by attachment to the wheel spindle, facilitates accurate checking of kingpin or steering axis inclination and also provides for accurate indication of caster correction as caster is corrected, all without introduction of errors from extraneous sources, such as looseness of the brake anchors.

From the foregoing, it will be appreciated that I have provided a guage for indicating all angles pertinent to checking and correcting the alinement of the front or steering wheels of vehicles. In particular, I have constructed the gauge for economical mass production to exacting standards without reliance on minute manufacturing tolerances. Also, I have provided for expedient calibration of the gauge, for adaptation of the same to substantially any attachment means, and for complete interchangeability of gauges and attaching means. Consequently, all of the objects and advantages of the invention have been shown herein to be attained in a convenient, economical and practical manner.

While I have shown and described what I regard to be the preferred embodiment of my invention, it will be appreciated that various changes, rearrangements and modifications may be made therein without departing from the scope of the invention, as defined by the appended claims.

I claim:

1. A wheel alinement gauge comprising a flat hollow body open at its top and having a longitudinal shaft-like projection centrally of one end thereof, bosses within said body defining a longitudinally extending bearing surface adjacent said one end of said body alined generally with said projection, a recess generally centrally of said body opening to the bottom of the body and having an annular spherical seat about the opening and a transverse bearing surface to the side of said recess opposite said longitudinal bearing surface, a leveling vial assembly adjustably mounted in said recess and comprising a holder having an annular spherical seat complemental to and engaging with the first-named spherical seat, a spherical vial cemented in said holder and facing downwardly in alinement with said opening, an upwardly extending stem on said holder, a plate engaging about said stem and slidable on said bosses for accommodating adjustment of said holder about the complemental surfaces of said spherical seats and means locking said plate in adjusted position on said bosses, three level assemblies each comprising an upwardly open elongate holder having a transverse shaft receiving opening generally centrally therethrough, a level cemented in the holder and a scale plate secured to the upper surface of the holder about the level, a first shaft extending through the opening in one of said level assemblies and pivotally mounting the same on said longitudinal bearing surface, a second shaft extending through the openings in the other level assemblies and pivotally mounting the same in spaced parallel relation on said transverse bearing surface, a clamp securing each of said shafts to said bosses, a pair of longitudinally spaced tubular bosses in said body beneath one of the latter two level assemblies, a pair of adjusting studs threaded through said bosses and engaging the lower surface of the level assembly to opposite sides of its pivot axis for adjusting the level assembly relative to the body, a spring confined between the body and the lower surface of each of the other level assemblies to one side of the pivot axis thereof and an adjusting screw threaded through the body beneath each of these assemblies and engaging the lower surface thereof to the opposite side of its pivot axis for adjusting the same relative to said body, the scale plate of the level assembly adjusted by said studs bearing two graduated scales for indicating wheel camber, one scale being twice the scale of the other, the scale plate of the parallel level bearing two graduated scales one for indicating the wheel caster and the other for indicating camber correction, the scale plate of the third level bearing two scales one for indicating kingpin inclination and the other for indicating caster correction, and an adapter removably mounted on said shaft-like projection and comprising an adapter body, a magnet at one end of said adapter body for engagement with a wheel hub, a socket in the other end of said adapter body for reception of said projection, a collar on said socket engageable with said projection for alining the same in the adapter body, and adjusting means between said adapter body and said collar for alining the collar axially with the magnet.

2. A wheel alinment gauge comprising a hollow body having a longitudinal projection at one end thereof, bosses within said body defining a longitudinally extending bearing surface, a transverse bearing surface and a recess generally centrally of said body opening to one surface of the body and having a seat about the opening, a leveling vial assembly adjustably mounted in said recess and comprising a holder having a seat complemental to and engaging with the first-named seat, a spherical vial secured in said holder and facing into said opening, a plate engaging said holder and shiftable on said bosses for accommodating adjustment of said holder about the complemental surfaces of said seats and means locking said plate in adjusted position on said bosses, three level assemblies each comprising an elongate holder having a transverse shaft-receiving opening generally centrally therethrough and a level secured in the holder and exposed at the surface of said holder and said body opposite said one surface of said body, a first shaft extending through the opening in one of said level assemblies and pivotally mounting the same on said longitudinal bearing surface, a second shaft extending through the opening in the other level assemblies and pivotally mounting the same in spaced parallel relation on said transverse bearing surface, a clamp securing each of said shafts to said bosses, a pair of adjusting studs threaded through said body beneath one of the latter two level assemblies, said studs engaging the lower surface of this level assembly to opposite sides of its pivotal axis for adjusting the level assembly relative to the body, a spring confined between the body and the lower surface of each of the other level assemblies to one side of the pivot axis thereof and an adjusting screw threaded through the body beneath each of these assemblies and engaging the lower surface thereof to the opposite side of its pivot axis for adjusting the same relative to said body, and an adapter removably mounted on said projection and comprising an adapter body, means at one end of said body for engagement with a wheel hub, a socket in the other end of said adapter body for reception of said projection, a collar in said socket engageable with said projection for alining the same in the adapter body, and adjusting means between said adapter body and said collar for alining the collar in a position perpendicular to the face of the wheel hub.

3. A wheel alinement gauge comprising a flat hollow body open at its top and having bosses therein defining a longitudinally extending bearing surface adjacent one end of the body, a recess generally centrally of the body opening to the bottom of the body and having an annular spherical seat about the opening and a transverse bearing surface to the side of said recess opposite said longitudinal bearing surface, a leveling vial assembly adjustably mounted in said recess and comprising a holder having an annular spherical seat complemental to and engaging with the first-named spherical seat, a spherical vial cemented in said holder and facing downwardly in alinement with said opening, an upwardly extending stem on said holder, a plate engaging about said stem and slidable on said bosses for accommodating adjustment of said holder about the complemental surfaces of said spherical seats and means locking said plate in adjusted position on said bosses, three level assemblies each comprising an upwardly open elongate holder having a transverse shaft-receiving opening generally centrally therethrough, a level cemented in the holder and a scale plate secured to the upper surface of the holder about the level, a first shaft extending through the opening in one of said level assemblies and pivotally mounting the same on said longitudinal bearing surface, a second shaft extending through the openings in the other level assemblies and pivotally mounting the same in spaced parallel relation on said transverse bearing surface, a clamp securing each of said shafts to said bosses, a pair of longitudinally spaced studs threaded through said body beneath one of the latter two levels, said studs adjustably engaging the lower surface of this level assembly to opposite sides of its pivot axis for adjusting the level assembly relative to the body, a spring confined between the body and the lower surface of each of the other level assemblies to one side of the pivot axis thereof and an adjusting screw threaded through the body beneath each of these assemblies and engaging the lower surface thereof to the opposite side of its pivot axis for adjusting the same relative to said body, the scale plate of the level assembly adjusted by said studs bearing two graduated scales for indicating wheel camber, one scale being twice the scale of the other, the scale plate of the parallel level bearing two graduated scales one for indicating wheel caster and the other for indicating camber correction, the scale plate of the remaining level bearing two scales one for indicating steering axis inclination and the other for indicating caster correction.

4. A wheel alinement gauge comprising a hollow body, bosses within said body defining a longitudinally extending bearing surface, a transverse bearing surface and a recess generally centrally of said body opening to one surface of the body and having a seat about the opening, a leveling vial assembly adjustably mounted in said recess and comprising a holder having a seat complemental to and engaging with the first-named seat, a spherical vial secured in said holder and facing into said opening, a plate engaging said holder and shiftable on said bosses for accommodating adjustment of said holder about the complemental surfaces of said seats and means locking said plate in adjusted position on said bosses, three level assemblies each comprising an elongate holder having a transverse shaft-receiving opening generally centrally therethrough and a level secured in the holder and exposed at the surface of said holder and said body opposite said one surface of said body, a first shaft extending through the opening in one of said level assemblies and pivotally mounting the same on said longitudinal bearing surface, a second shaft extending through the openings in the other level assemblies and pivotally mounting the same in spaced parallel relation on said transverse bearing surface, clamp means securing each of said shafts to said bosses, a pair of longitudinally spaced adjusting studs threaded through said body beneath one of the latter two level assemblies, said studs adjustably engaging the lower surface of this level assembly to opposite sides of its pivot axis for adjusting the level assembly relative to the body, a spring confined between the body and the lower surface of each of the other level assemblies to one side of the pivot axis thereof and an adjusting screw threaded through the body beneath each of these assemblies and engaging the lower surface thereof to the opposite side of its pivot axis for adjusting the same relative to said body.

5. A wheel alinement gauge comprising a hollow upwardly open body casting defining three elongate recesses, two extending in spaced parallel relation longitudinally of the body and the third extending transversely of the body adjacent one end thereof, and bearing surfaces to opposite sides of each recess the axes of which generally bisect the respective recess, a level assembly adjustably mounted in each recess, each assembly comprising an elongate upwardly open holder having a generally centrally disposed transverse opening therethrough and an upwardly exposed spirit level cemented in the holder, a first shaft extending through the opening in the level assembly in the transverse recess and mounted on the bearing surfaces to opposite sides of said transverse recess, a second shaft extending through the openings in the level assemblies in the parallel recesses and mounted on the bearing surfaces to opposite sides of the parallel recesses, a pair of clamps detachably secured to the body about portions of respective ones of said shafts for detachably mounting said shafts and said level assemblies in said body for pivotal movement about the axes of said shafts, a pair of adjusting elements for each of said level assemblies, said elements being mounted on said body and each pair engaging the respective element to opposite sides of the respective shaft, the adjusting elements of the transversely disposed level assembly and one of the longitudinally disposed level assemblies including portions extending to the exterior of the body, the adjusting elements of the other longitudinally disposed level assembly being imbedded in the body, said body also including a generally centrally disposed recess opening to the bottom of said body and an adjusting seat about the opening, a leveling vial seated in said recess and comprising a holder having a downwardly facing seat complemental to and engaging with said adjusting seat, a spherical leveling vial cemented in said holder and exposed through said opening, and means adjustably securing said leveling vial to said body.

6. A wheel alinement gauge comprising a hollow body defining three elongate recesses, two extending in spaced parallel relation longitudinally of the body and the third extending transversely of the body adjacent one end thereof, and bearing surfaces to opposite sides of each recess the axes of which intersect the respective recess, a level assembly adjustably mounted in each recess, each assembly comprising an elongate holder having a transverse shaft-receiving opening therethrough and a spirit level secured in the holder, a first shaft extending through the opening in the level assembly in the transverse recess and mounted on the bearing surfaces to opposite sides of said transverse recess, a second shaft extending through the openings in the level assemblies in the parallel recesses and mounted on the bearing surfaces to opposite sides of the parallel recesses, a clamp detachably secured to the body about portions of each of said shafts for detachably mounting said shafts and said level assemblies in said body for pivotal movement about the axes of said shafts, and adjusting elements for each of said level assemblies mounted on said body, the transversely disposed level assembly and one of the longitudinally disposed level assemblies including adjusting elements extending to the exterior of the body, said body also including a recess opening to the side of said body opposite the side to which the spirit levels are exposed and an adjusting seat about the opening, a leveling vial seated in said recess and comprising a holder having a seat complemental to and engaging with said adjusting seat, a spherical leveling vial secured in said holder and exposed through said opening, and means adjustably securing said leveling vial to said body.

7. In a wheel alinement gauge having a body, an opening in the body, an inwardly facing seat surrounding said opening, a leveling vial assembly adjustably mounted on said seat, said assembly comprising a holder having an open end, a seat on said end complementary to and engaging said seat on said body and a leveling vial in said holder exposed through said opening, and locking means engaged with said assembly and adjustably engaging said body for adjustably locking said assembly to said body.

8. In a wheel alinement gauge having a body, an opening in the body, a spherical seat in the body surrounding said opening, a leveling vial assembly adjustably mounted on said seat, said assembly comprising a holder having an open end and a spherical seat on said end complementary to and engaging said seat on said body and a leveling vial in said holder exposed through said opening, and a locking plate engaged with said assembly and slidably engaging said body for adjustably locking said assembly to said body.

9. In a wheel alinement gauge having a body, a recessed boss in the body, an opening in the body at the bottom of said recess, an inwardly facing spherical seat in said recess surrounding said opening, a leveling vial assembly adjustably mounted in said recess, said assembly comprising a holder having an open end, a spherical seat on said end complementary to and engaging said spherical seat in said recess and a spherical leveling vial cemented in said holder and exposed through said opening, and a locking plate engaged with the opposite end portion of said assembly and slidably engaging said boss for adjustably locking said assembly in said recess.

10. In a wheel alinement gauge having a gauge body and an adapter for securing the body to a wheel, the improvement comprising a stem on the body for detachable reception of the adapter, a socket in the adapter, a sleeve in said socket for reception of said stem, said sleeve having radial clearance relative to said socket, and adjusting means on the adapter engaging said sleeve at circumferentially spaced locations for adjusting the axis of said sleeve, and thus of said stem, relative to the axis of the adapter.

11. In a wheel alinement gauge having a gauge body and an adapter for securing the body to a wheel, the improvement comprising a stem on the body for detachable reception of the adapter, a socket in the adapter, a collar in said socket for reception of said stem, said collar and said stem having cooperable key and keyway means, a locking screw threaded through said collar for locking engagement with said stem, said collar having radial clearance relative to said socket, and a plurality of circumferentially spaced adjusting screws threaded through the adapter and engaging one end portion of said collar for adjustably locating the axis of said collar, and thus of said stem, relative to the axis of the adapter.

12. The process of determining the alinement characteristics of a vehicle wheel by use of a gauge having means for indicating caster, camber and steering axis inclination, comprising the steps of mounting the gauge on the hub of the wheel by means of a magnetic adapter for determination of caster and camber, and mounting the gauge on the spindle of the wheel by a clamp-type adapter for determination of steering axis inclination.

References Cited in the file of this patent

UNITED STATES PATENTS

| | | |
|---|---|---|
| 2,706,341 | Havens | Apr. 19, 1955 |
| 2,831,264 | Weaver | Apr. 22, 1958 |

FOREIGN PATENTS

| | | |
|---|---|---|
| 476,617 | Italy | Dec. 17, 1952 |
| 792,921 | Great Britain | Apr. 9, 1958 |